(12) United States Patent
Puterman-Sobe et al.

(10) Patent No.: US 8,886,639 B2
(45) Date of Patent: Nov. 11, 2014

(54) SEMANTICALLY ENRICHED SEARCH OF SERVICES

(75) Inventors: Rotem Puterman-Sobe, Rishon-Lezion (IL); Victor Shafran, Kfar Adumim (IL)

(73) Assignee: SAP AG, Walldorf (DE)

( * ) Notice: Subject to any disclaimer, the term of this patent is extended or adjusted under 35 U.S.C. 154(b) by 113 days.

(21) Appl. No.: 13/450,596

(22) Filed: Apr. 19, 2012

(65) Prior Publication Data

US 2013/0282703 A1    Oct. 24, 2013

(51) Int. Cl.
*G06F 17/30* (2006.01)

(52) U.S. Cl.
USPC ............................ 707/723; 707/722; 707/748

(58) Field of Classification Search
CPC .................... G06F 17/30616; G06F 17/30613; G06F 17/2785
USPC .......................................... 707/723, 722, 748
See application file for complete search history.

(56) References Cited

U.S. PATENT DOCUMENTS

| | | | | |
|---|---|---|---|---|
| 6,438,543 | B1* | 8/2002 | Kazi et al. ............... | 707/999.005 |
| 7,243,102 | B1* | 7/2007 | Naam et al. ............. | 707/999.002 |
| 7,680,945 | B2 | 3/2010 | Hoffmann et al. | |
| 7,716,279 | B2 | 5/2010 | Savchenko et al. | |
| 8,195,655 | B2* | 6/2012 | Agrawal et al. ............... | 707/730 |
| 2005/0216443 | A1* | 9/2005 | Morton et al. ..................... | 707/3 |
| 2006/0047656 | A1* | 3/2006 | Dehlinger et al. ................. | 707/6 |
| 2007/0288421 | A1* | 12/2007 | Chakrabarti et al. ............. | 707/1 |
| 2008/0005086 | A1* | 1/2008 | Moore .............................. | 707/3 |
| 2009/0024605 | A1* | 1/2009 | Yang ................................. | 707/5 |
| 2009/0070322 | A1* | 3/2009 | Salvetti et al. ..................... | 707/5 |
| 2009/0083262 | A1* | 3/2009 | Chang et al. ...................... | 707/5 |
| 2009/0106271 | A1* | 4/2009 | Chieu et al. ..................... | 707/100 |
| 2009/0198676 | A1* | 8/2009 | Taylor et al. ...................... | 707/5 |
| 2010/0281024 | A1* | 11/2010 | Burges ........................... | 707/723 |
| 2012/0221562 | A1* | 8/2012 | Zhang et al. ................... | 707/728 |
| 2012/0310915 | A1* | 12/2012 | Yang ............................... | 707/711 |

OTHER PUBLICATIONS

Open Data Protocol [online]. Wikipedia, 2011,[retrieved on Apr. 18, 2012]. Retrieved from the Internet: <URL: http://en.wikipedia.org/w/index.php?title=Open_Data_Protocol&oldid=422638903>, 1 page.
ES Workplace [online]. SAP, 2009, [retrieved on Apr. 18, 2012]. Retrieved from the Internet: <URL: http://wiki.sdn.sap.com/wiki/display/ESpackages/ES+Workplace>, 2 pages.
"Maximizing Website Return on Investment: The Crucial Role of High-Quality Search," *Google*, 2011, 7 pages.
"OData in a nutshell," *SAP AG*, 2011, 19 pages.
"Return on Information: Improving your ROI with Google Enterprise Search," *Google*, 2011, 11 pages.

(Continued)

*Primary Examiner* — Rehana Perveen
*Assistant Examiner* — Tiffany Thuy Bui
(74) *Attorney, Agent, or Firm* — Fish & Richardson P.C.

(57) ABSTRACT

A computer-implemented method for performing a semantically enriched search of services includes: receiving a search string that a user inputs for searching services in a repository; generating queries from the search string; searching a multi-document index using the generated queries, the multi-document index including, for each of the services, an index entry comprising documents interlinked with each other, each of the documents reflecting at least one aspect regarding the service; and presenting an outcome of the search to the user in response to receiving the search string.

17 Claims, 7 Drawing Sheets

(56) References Cited

OTHER PUBLICATIONS

"BlackBerry Enterpries Server for MDS Applications," *Blackberry*, 2007, 4 pages.

"Compass Reference Documentation 2.2.0 GA," *Compass*, 2008, 206 pages.

D222 WSMX Documentation [online]. Bidstart, 2011, [retrieved on Apr. 18, 2012]. Retrieved from the Internet: <URL: http://www.bidstart.com/wiki/D22_WSMX_Documentation>, 16 pages.

Database index [online]. Wikipedia, 2011, [retrieved on Apr. 18, 2012]. Retrieved from the Internet: <URL: Wikiphttp://en.wikipedia.org/w/index.php?title=Database_index&oldid=421861639>, 6 pages.

Enterprise Application Platform, Convertigo [online]. Invertigo, 2011, [retrieved on Apr. 18, 2012]. Retrieved from the Internet: <URL: http://www.convertigo.com/en/crm/convertigo-mobilizer.html>, 3 pages.

Enterprise Search Matrix [online]. New Idea Engineering, 2009, [retrieved on Apr. 18, 2012]. Retrieved from the Internet: <URL: http://www.ideaeng.com/enterprise-search-matrix-0206>, 6 pages.

"IBM Sterling Gentran: Server for Microsoft Windows: SAP Gateway Configuration Guide Version 5.3," *IBM*, 2011, 48 pages.

Karl and Reddymeka, "BPM106 Speed up your enterprise service consumption with ES workplace, lean consumption and simple samples," *SAP AG*, 2009, 5 pages.

Kuester et al., "OPOSSum—An Online Portal to Collect and Share SWS Descriptions," *Institute for Informatics, Friedrich-Schiller-University*, Jena, Germany, 2008, 2 pages.

Lucene [online]. Wikipedia, 2011, [retrieved on Apr. 18, 2012]. Retrieved from the Internet: <URL: http://en.wikipedia.org/w/index.php?title=Lucene&oldid=422532549>, 3 pages.

Lucene Apache 2.0 Licensed [online]. Lucene, 2011 [retrieved on Apr. 18, 2012]. Retrieved from the Internet: <URL: http://lucene.apache.org/>, 8 pages.

Oxyus [online]. Java-source.net, 2010, [retrieved on Apr. 18, 2012]. Retrieved from the Internet: <URL: http://web.archive.org/web/20101217030515/http://java-source.net/open-source/search-engines/oxyus>, 3 pages.

Search engine indexing [online]. Wikipedia, 2011, [retrieved on Apr. 18, 2012]. Retrieved from the Internet: <URL: http://en.wikipedia.org/w/index.php?title=Search_engine_indexing&oldid=422478850>, 12 pages.

Sudeesh, "SAP NetWeaver Gateway: Any environment, any device, any developer," *SAP AG*, 2011, 13 pages.

Tr*idf [online]. Wikipedia, 2011, [retrieved on Apr. 18, 2012]. Retrieved from the Internet: <URL: http://en.wikipedia.org/w/index.php?title=Tf*idf&oldid=422995228>, 4 pages.

Toch et al. "OPOSSUM: Bridging the gap between web services and the semantic web," *Faculty of Industrial Engineering and Management Techninion*—Israel Institute of Technology, 2011, 3 pages.

W3C, "Semantic Web Services Language (SWSL)," W3C, 2005, 44 pages.

Web Services Description Language [online]. Wikipedia, 2011, [retrieved on Apr. 18, 2012]. Retrieved from the Internet:<URL: http://en.wikipedia.org/w/index.php?title=Web_Services_Description_Language&oldid=423871670>, 5 pages.

Wordnet [online]. Wikipedia, 2011, [retrieved on Apr. 18, 2012]. Retrieved from the Internet: <URL: http://en.wikipedia.org/w/index.php?title=WordNet&oldid=423805435>, 10 pages.

WSMX: What is it? [online]. WSMX, 2008, [retrieved on Apr. 18, 2012]. Retrieved on the Internet<URL: http://www.wsmx.org/>, 2 pages.

* cited by examiner

SEMANTICALLY ENRICHED SEARCH OF SERVICES

BACKGROUND

Many of the applications and other software being developed nowadays rely on one or more services. Software processing is sometimes provided as web services that users can tap into using one or more programs. Various solutions involving cloud computer systems and/or software as a service (SaaS) have been proposed for these purposes.

However, the developer who wishes to employ services in an application is not always an expert in, or sometimes not even familiar with, the particular underlying technology that provides the service(s). For example, a developer may wish to create an application for a mobile device (e.g., a so-called "app" for a smartphone), that exposes complex business data (e.g., data managed by systems from SAP AG) for easy consumption by a user. To access and fully benefit from such complex business data, a number of the accompanying services (e.g., SAP services) must also be invoked in the mobile application. If this particular developer is not an expert in the underlying business system, it can be challenging to ascertain what actions the available services provide, and to select the relevant services for the developer's application.

SUMMARY

In a first aspect, a computer-implemented method for performing a semantically enriched search of services includes: receiving a search string that a user inputs for searching services in a repository; generating queries from the search string; searching a multi-document index using the generated queries, the multi-document index including, for each of the services, an index entry comprising documents interlinked with each other, each of the documents reflecting at least one aspect regarding the service; and presenting an outcome of the search to the user in response to receiving the search string.

Implementations can include any or all of the following features. The multi-document index has an index architecture comprising: a service document that represents the service; an entity-set document that represents a data element of the service; an entity-type document that represents a data type of one or more entries being returned as a service response; a complex-type document that represents a data type of a non-simple typed property; a function document that represents at least one service operation of an entity set; a navigation property document that represents at least one association from an entity-type entity to one or more related entities of another entity type; a property document that represents a field of a data type; and a parameter document that represents a service operation parameter. The method further includes: parsing the search string to generate one or more words; for each index entry identified in the search, aggregating information of related entities; generating an array of results per each of the generated words; scoring the array; and flattening the array into a single result list. The method further includes: generating one or more semantic forms of at least one of the words, wherein the semantic forms are used in searching the multi-document index. Generating the one or more semantic forms comprises: identifying one or more synonyms, abbreviations, acronyms or naming conventions for at least one of the words; generating, for each of the words and the semantic forms, a wildcard query that has a wildcard character before and after the word or the semantic form; and searching the documents using the wildcard queries. The search provides multiple results, and the method further includes: scoring the multiple results, wherein each result is given at least first and second scores; for each result, weighting the result using the at least first and second scores; and ranking the results based on the weighting, wherein the ranked results are included in the outcome of the search. The multi-document index has hierarchy levels with components, wherein the first score represents an average percentage of words from the search string that occur in each component of the hierarchy levels, and the second score represents a percentage of the words from the search string that appear in any component of the hierarchy levels relating to the result.

A computer program product tangibly embodied in a computer-readable storage medium and comprising instructions that when executed by a processor perform a method for performing a semantically enriched search of services. The method includes: receiving a search string that a user inputs for searching services in a repository; generating queries from the search string; searching a multi-document index using the generated queries, the multi-document index including, for each of the services, an index entry comprising documents interlinked with each other, each of the documents reflecting at least one aspect regarding the service; and presenting an outcome of the search to the user in response to receiving the search string.

A system comprising: one or more processors; and a computer program product tangibly embodied in a computer-readable storage medium and comprising instructions that when executed by a processor perform a method for performing a semantically enriched search of services. The method includes: receiving a search string that a user inputs for searching services in a repository; generating queries from the search string; searching a multi-document index using the generated queries, the multi-document index including, for each of the services, an index entry comprising documents interlinked with each other, each of the documents reflecting at least one aspect regarding the service; and presenting an outcome of the search to the user in response to receiving the search string.

Implementations can provide any or all of the following advantages: Allowing useable and intuitive searching of relevant services for the end user, which searching can exploit an internal structure and semantics of the service repository and provide answers with low performance overhead. Indexing and scoring can be performed with a low performance footprint. A custom index architecture can accommodate rich metadata and different structures of service repositories, such as by a complex structured index where various documents can be interlinked. Service discovery can employ a complex multi-phase query process and aggregate the results. The service discovery can utilize both technical and business information for services and be usable by both business and technical users. A scoring function can be used in information retrieval to assign a score to each result for comparison. A custom scoring function can be used for scoring results where documents represent service artifacts and not English text. Heterogeneous vocabularies of end users can be addressed by a vocabulary, such as in a custom query building process, in order to map various user terminologies to the terminology used by the services. Terminology from naming conventions can be expanded into readable text before metadata is stored and indexed.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes examples of performing text based discovery of relevant services in one or more service repositories. Some implementations feature searching of both a textual description and a structured and interconnected meta-model to find the relevant services. For example, OData services can be discovered in this way, such as those called "OData for SAP Protocol" services. Some implementations take into account that various end users may use different vocabularies to define the same thing. Before performing a search, a system can normalize various vocabularies to one vocabulary that is supported by the service repository. Some implementations update the search result to account for changes in the service repository.

Figure 1:
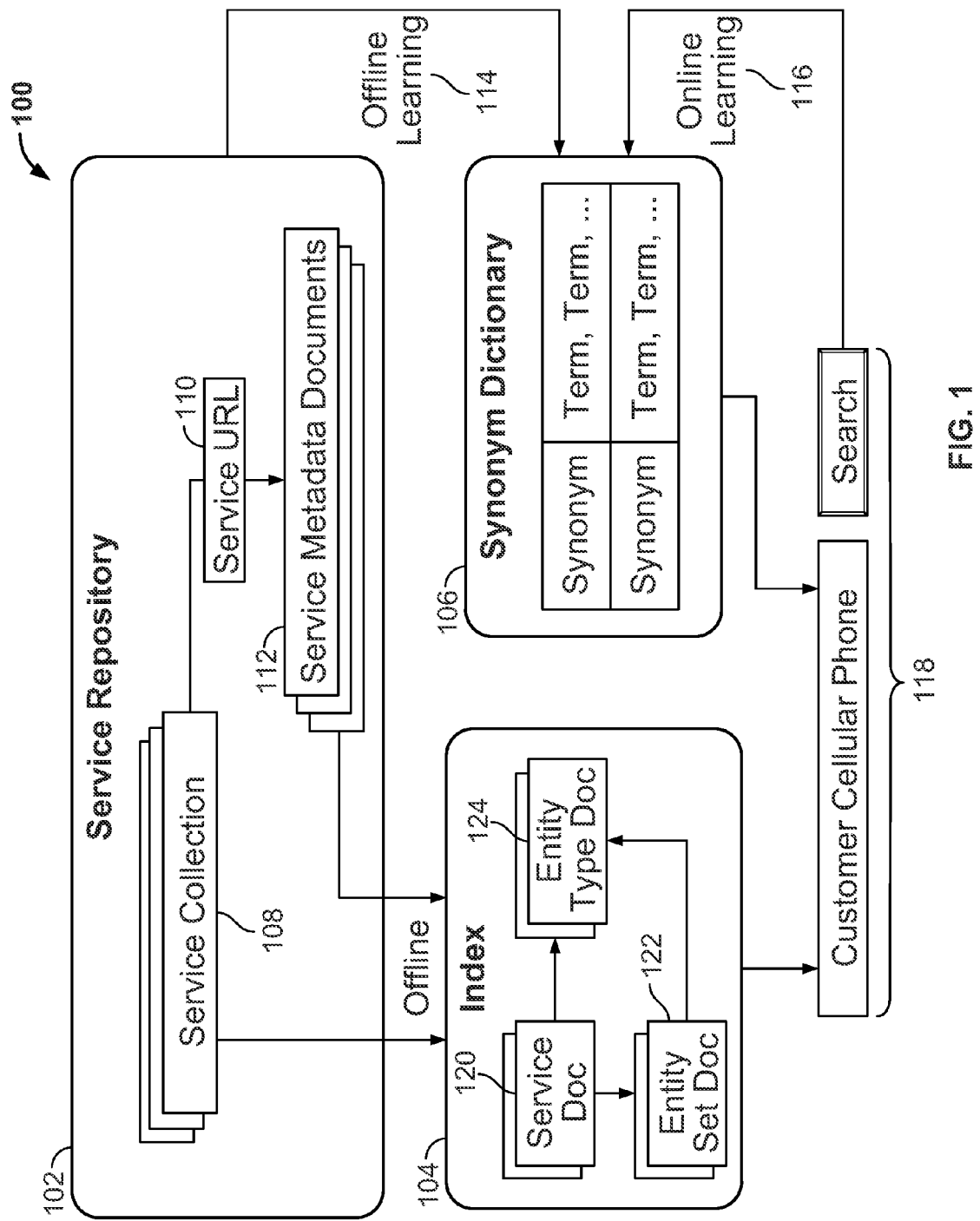
FIG. 1 shows an example architecture that can be used for discovering relevant services.

FIG. 1 shows an example architecture 100 that can be used for discovering relevant services. The architecture 100 includes at least one service repository 102, at least one index 104 and at least one synonym dictionary 106. For example, the architecture 100 can be a custom index architecture that can accommodate rich metadata and structures of one or more service repositories. A service discovery task in the architecture 100 can be performed using a complex multi-phase process and aggregation of results. The architecture 100 can use a scoring function to assign a score to each of one or more results, for example to allow comparisons between the results. In some implementations, the scoring function can be based on term frequency—inverse document frequency (tf/idf) measures. For example, the scoring function can work with documents in any language, such as English. The architecture 100 can use a custom scoring function for scoring other results, such as where documents represent service artifacts and not text (e.g., not English text). The architecture 100 can use the synonym dictionary, or any mapping vocabulary, to map user terminologies to terminologies used in the service repository 102. Service metadata in the service repository 102 can be encoded using one or more naming conventions that are not readily understandable to some end users.

The service repository 102 here includes one or more service collections, having a service uniform resource locator (URL) 110, and one or more service metadata documents 112. The service repository (including the services information—such as name, description and URL—and the service metadata documents called using these URLs) is indexed as a preprocessing step. This generates the index 104 in part or in its entirety.

When the user performs a search, the index 104 is used in order to find and display the relevant service artifacts as the search result. The synonym dictionary 106 can also be used in this process to create the appropriate set of queries for searching the index. The synonym dictionary 108 is created in advance and can be extended and refined using one or more processes. For example, an offline learning process 114 uses terms that appear in the service repository. As another example, an online learning process 116 uses the user search queries and selected results. The architecture 100 can be used to perform a search over any hierarchical or object-oriented model.

The following is an example of a scenario supported by the architecture 100. A user formulates a free text query 118 and submits it to the system. For example, the free text query may be "customer cellular phone". In some implementations, part or all of the architecture 100 runs on the client side, and the free text query is then submitted locally. The system analyzes the free text query and expands one or more naming conventions or heterogeneous vocabularies used by the user. This allows the system to produce a custom query that is normalized to the vocabulary of the service repository 102. The system then executes the custom query and produces a ranked list of one or more matching services along with the service components where the matches were found, for each service in the list. For example, this can highlight the search result matches.

The index 104 here includes one or more service documents 120, one or more entity set documents 122, and one or more entity type documents 124. For example, the documents 120, 122 and/or 124 can be created in a preprocessing indexing step. In some implementations, the service repository 102 includes one or more OData services.

The service repository 102 can use one or more data models. In some implementations, a OData data model—optionally with one or more extensions, such as an SAP specific extension—is used. The OData model, for example, contains the following artifacts:

Service entity represents the OData service and contains the following fields:
 1. Name
 2. Description
 3. Author
 4. URL
 5. A collection of Entity-Set entities
 6. A collection of Entity-Type entities
 7. A collection of Function entities Entity-Set entity represents the data element of the service and contains the following fields:
 1. Name
 2. Entity-Type entity Entity-Type entity (represents a data type of entries which may be returned as a service response, mostly of an entity-set query):
 1. Name
 2. A collection of Property entities
 3. A collection of Navigation-Property entities Property entity (represents a field of a data type, as entity-type or complex-type):
 1. Name
 2. Type (this type may be a simple type, or a Complex-Type entity):
 3. Label
 4. Semantics Complex-Type entity (represents a data type of a non-simple typed property):
 1. Name
 2. A collection of Property entities Navigation-Property entity (represents an association from an entity-type entity to its related entities of another entity-type):
1. Name
2. Target Entity-Type
3. Label Function entity (represents a service operation which is not a Read/Create/Update/Delete of an entity-set):
1. Name
2. Documentation
3. A collection of Parameter entities
4. Return type (this type may be a simple type, a Complex-Type entity, an Entity-Type entity or a collection of any of those)
5. HTTP method to use Parameter entity (represents a service operation parameter)
1. Name
2. Type (this type may be a simple type, a Complex-Type entity, or an Entity-Type entity)
3. Documentation One or more indexes can then be built, taking into account the structure of the services, for example, the hierarchical structure of the OData services. This can provide searching among all service components for each user search query, while obtaining the benefits of having a single index.

In some implementations, the index can be structured as follows. For each entity of the service data model, an index document can be created that includes all the simple text properties of the entity as index document fields. Index document field names are unique for each type of entity in the model. Multiple types of index documents are created—one per type of entity in the model—each having a unique set of fields. An index document can have multiple fields of the same name (with different values). For example, a collection of simple text properties of an entity can easily be stored.

Also, an ID field can be added for each entity, with a value that is generated from the entity ID of the parent and the unique ID of the entity. For example, the parent entity ID and the entity-unique ID can be separated by a delimiter. When more than one parent can hold a particular entity, the parent ID can be replaced by, or enhanced with, another ancestor ID, such as the service. For example, this can be the case with the relationship between Entity-Set and Entity-Type, where more than one entity set can be of the same entity type.

Finally, relations between entities are represented as a field in the index document of the entity. For example, the relation can reference the related entity by holding a unique ID for the referenced entity. A reference can be from an entity to its parent entity, such as from a Property to the Entity-Type that contains it. Also, a reference can be from an entity to its contained entity, such as when an entity can be related to more than one parent entity, for example as with Entity-Set and Entity-Type. Similarly to simple text properties, a collection of references can be stored using multiple fields with the same name, wherein the name represents the reference. Other index structures can be used.

Figure 2:
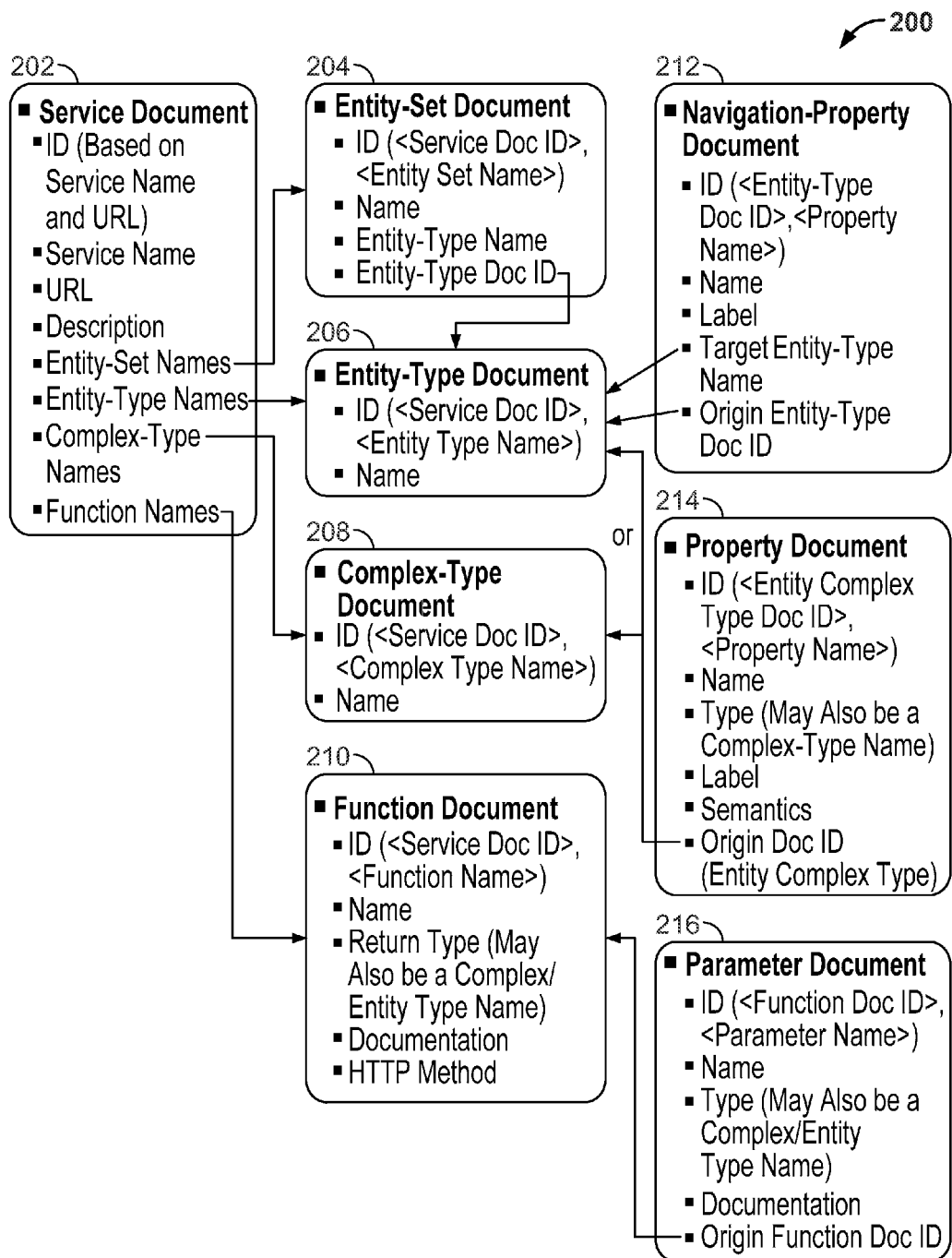
FIG. 2 shows an example of an index structure that can be used for discovering relevant services.

FIG. 2 shows an example of an index structure 200 that can be used for discovering relevant services. The index structure 200 here includes a service document 202, an entity-set document 204, an entity-type document 206, a complex-type document 208 and a function document 210. The following are examples regarding artifacts in a data model.

The service document 202 represents a service and contains one or more fields. The service document 202 here includes an ID, a service name, a URL, a description, one or more entity-set names, one or more entity-type names, one or more complex-type names and one or more function names. For example, the ID can be based on the service name and the URL; the entity-set names can represent a collection of entity-set entities; the entity-type names can represent a collection of entity-type entities; and/or the function names can represent a collection of function entities.

The entity-set document 204 represents the data element of the service. The entity-set document 204 here includes an ID, a name, an entity-type name and an entity-type document ID. For example, the ID can include a service document ID and/or an entity set name. The entity-type document ID can refer to the entity-type document 206.

The entity-type document 206 represents a data type of one or more entries that can be returned as a service response, such as to an entity-set query. The entity type document 206 here includes an ID and a name. For example, the ID can include a service document ID and/or an entity type name.

The complex-type document 208 represents a data type of a non-simple typed property. The complex-type document 208 here includes an ID and a name. For example, the ID can include a service document ID and/or a complex type name.

The function document 210 represents certain service operations of an entity set. In some implementations, the function document 210 represents service operations that are not Read, Create, Update or Delete operations. The function document 210 here includes an ID, a name, a return type, a documentation and a hypertext transfer protocol (HTTP) method. For example, the ID can include a service document ID and/or a function name. For example, the return type can also or instead be a complex-type and/or an entity-type name.

One or more navigation property documents 212 can be included in the index structure 200. For example, the navigation property documents 212 represent associations from an entity-type entity to one or more of its related entities of another entity type. The navigation property document 212 here includes an ID, a name, a label, a target entity-type name and an origin entity-type document ID. For example, each of the target entity-type name and the origin entity-type document ID can refer to one of the entity-type documents 206.

The index structure 200 can include one or more property documents 214. For example, the property document 214 represents a field of a data type, such as an entity-type or a complex-type. The property document 214 here includes an ID, a name, a type, a label, semantics and an origin document ID. For example, the ID can include an entity-type ID or a complex-type ID, and/or a property name. For example, the type may also or instead be a complex-type name. For example, the origin document ID can refer to an entity-type or a complex-type. In some implementations, the property document 214 refers to one of the entity-type document 206 and the complex-type document 208.

The index structure 200 can include one or more parameter documents 216. For example, the parameter document 216 can represent a service operation parameter. The parameter document 216 here includes an ID, a name, a type, a documentation and an origin function document ID. For example, the ID can include a function document ID and/or a parameter name. For example, the type can also or instead be a complex type or an entity type. In some implementations, the parameter document 216 refers to one or more of the function documents 210.

The user query (e.g., the free text query 118 in FIG. 1) can be translated into a set of queries over the different document types of the index documents. Moreover, the results can be aggregated according to relations between the entities. In each type of index document, only the simple text property fields are searched for the query terms, or for other semantic forms of the terms, including, but not limited to, synonyms, abbreviations, acronyms and similar terms.

Figure 3:
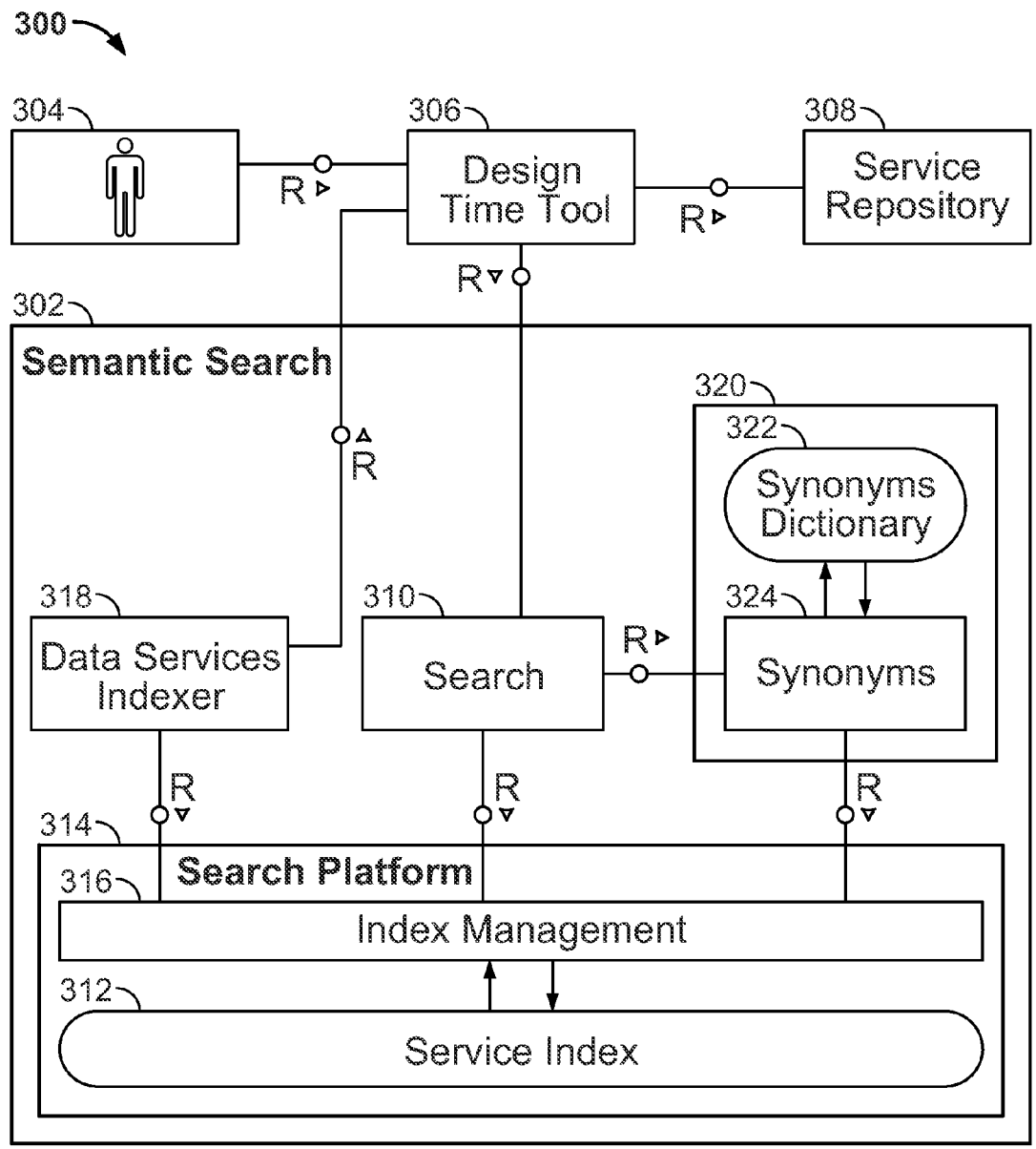
FIG. 3 shows an example of a general architecture.

FIG. 3 shows an example of a general architecture 300. The general architecture here includes a semantic search component 302 that can be used by at least one user 304, for example operating a design time tool 306, to search among services in a service repository 308 (e.g., the service repository 102 in FIG. 1). In this example, the semantic search component 302 is an independent component at a client side, which interacts only with the design time tool 306. The semantic search component 302 can be designed like a server-side component, for example such that it receives requests and sends responses. In other implementations, the semantic search component 302 can be distributed among multiple devices or run elsewhere, for example at the server side.

The semantic search component 302 here includes a search sub-component 310 that performs a semantic search over a service index 312 (e.g., the index 104 in FIG. 1).

The search component 310 supplies a search application programming interface (API), such as for free-text search and prefix auto-completion, to the design time tool 306.

The search component 310 can perform searching using any suitable search platform 314, which can provide basic search capabilities. In some implementations, the open source search platform Lucene can be used. In some implementations, the service index 312 is accessed through an index management layer 316. Such semantic search can include logic regarding synonyms, abbreviations and spellcheck over free-text search. As another example, logics of query prefix auto-completion can be included.

The semantic search component 302 here includes a data services indexer 318 that divides parsed services documentation into index documents and fields. For example, the services documentation can include, but is not limited to, metadata and useful repository information. The data services indexer 318 can use basic indexing capabilities supplied by the search platform 314. The division can drive the selection or design of an index structure, which in turn can impact search capabilities over the index, such as which data can be retrieved. The data services indexer 318 can supply a build-index API to the design time tool 306.

The search platform 314 includes service index storage and the index management layer 316. The index management layer 316 creates and maintains the service index 312 (e.g., stored on a file system) and enables basic search capabilities thereon (e.g., without any semantic logic).

The semantic search component 302 here includes a synonyms sub-component 320 that has a synonyms dictionary 322 (e.g., the synonym dictionary 106 in FIG. 1), such as a file, and an abstract synonyms layer 324. The abstract synonyms layer 324 creates the synonyms dictionary 322 using any suitable technology. In some implementations, the synonyms dictionary 322 is created using WordNet. For example, the synonyms dictionary 322 can be stored on the file system and be delivered with the semantic search component 302. The abstract synonyms layer 324 also allows the search sub-component 310 to find synonyms in the synonyms dictionary at runtime.

Figure 4:
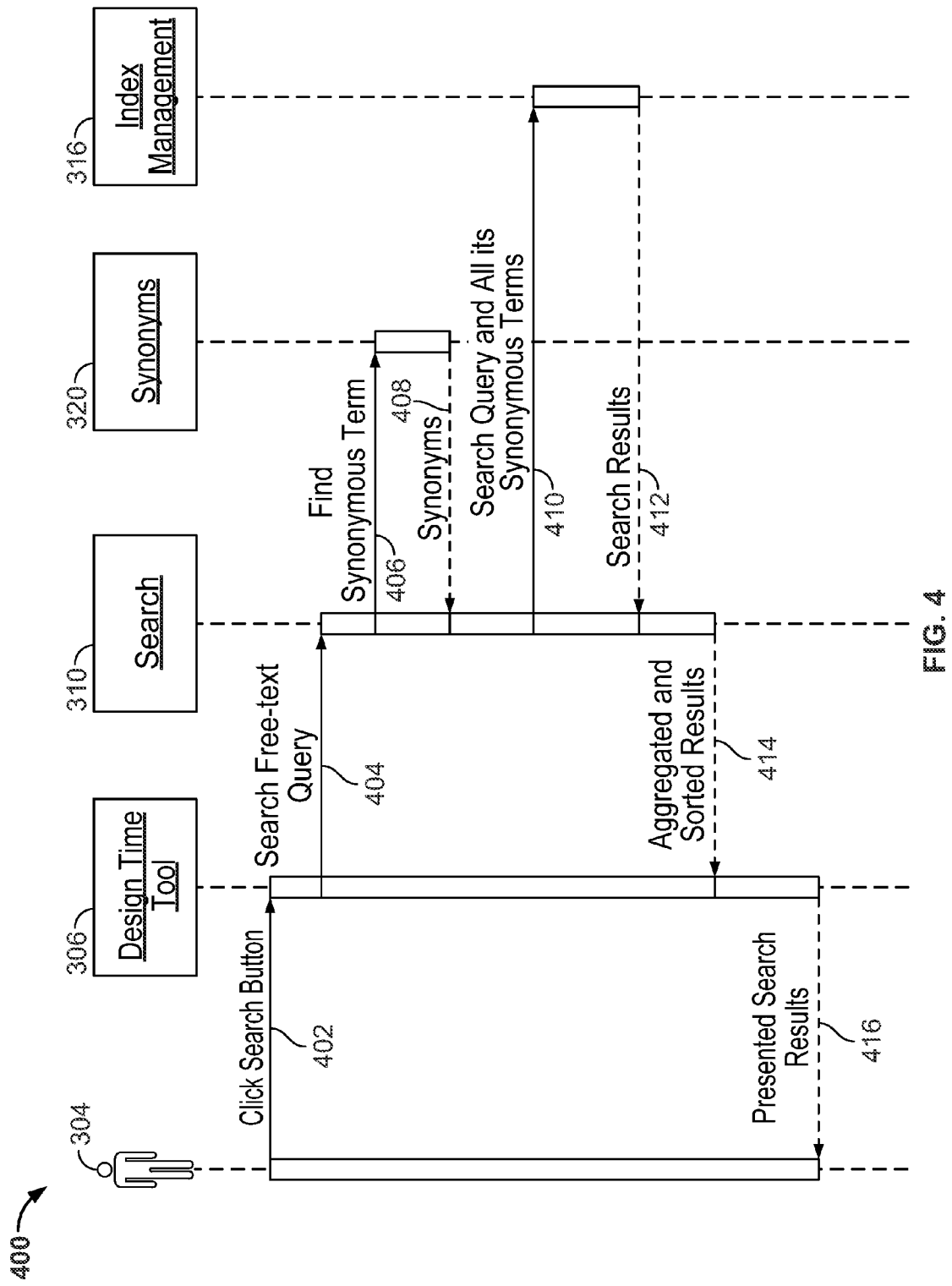
FIG. 4 shows an example of a free-text search sequence.

FIG. 4 shows an example of a free-text search sequence 400. The free-text search sequence 400 here involves some entities from FIG. 3: the user 304, the design time tool 306, the search sub-component 310, the synonyms sub-component 320 and the index management layer 316. More or fewer components can be used in some implementations. In some implementations, sentence analysis can be used to search the appropriate index components. For example, such sentence analysis can involve recognizing parts-of-speech or other fragments. This can lead to more relevant results being returned.

At 402, the user clicks a search button. At 404, the design time tool 306 instructs the search sub-component 310 to search the free-text query. At 406, the search sub-component 310 instructs the synonyms sub-component 320 to find one or more synonyms. For example, system-specific terms (e.g., SAP terms) can be identified. At 408, the synonyms sub-component 320 provides one or more synonyms.

At 410, the search sub-component 310 provides the search query an all its synonymous terms to the index management layer 316. The index management layer 316 provides results at 412.

At 414, the search sub-component 310 provides aggregated and sorted results to the design time tool 306. At 416, the design time tool 306 presents the search results to the user 304.

In some implementations, the user search query is translated into a set of queries over the different document types of the index documents, and the results are aggregated according to the relations between the entities. In each type of index document, only the simple text property fields will be searched for the query terms or for other semantic forms of these terms. For example, ID and reference fields will not be searched for these terms or their semantic forms.

In some implementations, a search process can be performed substantially as follows.

1. Each user query can be parsed into words.

2. For each word, a "wildcard query" can be performed in all the types of documents. For example, a wildcard character before and after the word can be used.

3. The same process can be performed also for each known semantic form of the word. For example, synonyms, abbreviations acronyms, etc., can be taken into account. In this case, the search can be performed once with a wildcard query, such as by using a wildcard character before and after the phrase, and instead of spaces, and once as a quoted query, such as in the original form with quotation marks.

4. For each result, of each type of document, the information of the related entities can be aggregated. For example, this can provide that each results contains the full information of its source and context, such as the service it came from its related entity set(s) and entity type(s), etc.

5. For each word, the search results that resulted from exactly the same index document (i.e., representing the same entity instance) can be aggregated, and redundant results can be omitted. For example, results from related entity-type and entity-set documents can be left out.

6. An array of results can then be created for each search query word. In some implementations, the array is a 1×N vector of lists. In such a vector, the ith cell of the vector can contain a list of results found while searching the ith query word. The ith query word may have been searched in its original form or in other semantic forms, such as synonyms, acronyms, etc. For example, for the query "customer cellular phone," the vector can contain three cells, holding the search results relating to "customer," "cellular" and "phone," respectively. A search result that appears in more than one cell can be given a higher score.

7. The resulting array can be scored based on relevance, and flattened into a single result list.

8. After the search for each word separately, an additional process of searching different forms of the whole search query string can be performed. For example, this can involve synonyms, acronyms, etc., for the query as a whole. These other forms can be searched once as a wildcard query, and once as a quoted query, in analogy with the description above.

9. Duplications can be eliminated from the united result list, and the list can be sorted by scoring the results, such as from highest to lowest. Sometimes, only part of the list is displayed to the user, such as according to a threshold score. For example, this can provide that not all "or" results are displayed to the user.

In some implementations, the searching process can include a special treatment of search operators that the user may add to the search query, such as and, or, not, etc. By contrast, wildcard characters may already be handled by the underlying indexing library.

In some implementations, one can search for other semantic forms of the query words (e.g., synonyms) only if the results with the original query words are too few, or have too low scores.

Figure 5:
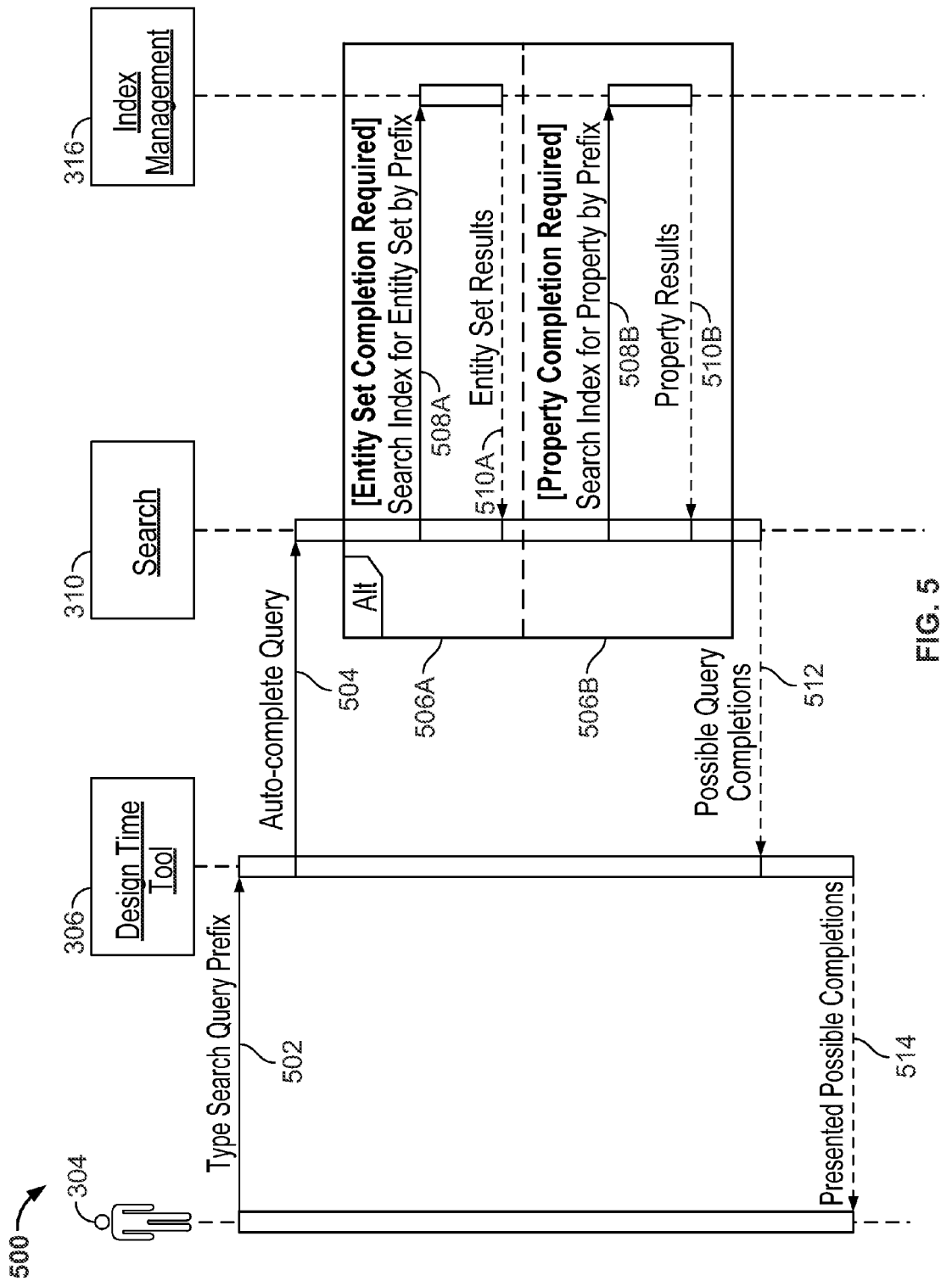
FIG. 5 shows an example of a prefix auto-completion sequence.

FIG. 5 shows an example of a prefix auto-completion sequence 500. One or more types of auto-completion can be used. The prefix auto-completion sequence 500 here involves some entities from FIG. 3: the user 304, the design time tool 306, the search sub-component 310 and the index management layer 316. More or fewer components can be used in some implementations.

At 502, the user types a search query prefix. For example, the user may be interested in services relating to employees, and therefore begins to type e-m-p- . . . in a search field (see, e.g., the free text query 118 in FIG. 1). At 504, the design time tool 306 instructs the search sub-component 310 to auto-complete the query that has been received so far. This is an example of a simple completion done without sentence analysis. In this case the suggested completions can include the results of all index components relevant for the typed prefix. For example, the step 504 may be performed when a certain number of characters (e.g., three) have been typed.

The search sub-component 310 can perform one or more operations in response to the step 504. This is an example of a more complex auto-completion based on sentence analysis. Some sentence analysis involves looking for one or more known patterns, such as typing a verb that describes a possible service operation. In such situations, the search can focus on a specific component of the service (e.g., an entity set or property) because the part-of-speech of the typed query sentence has been recognized. For example, assume that a user wishes to search for "find employees by" followed by an arbitrary term. When the user begins typing the character sequence f-i-n-d e-m-p, the processing can be done as follows. The assumption is that after a verb (here "find") should come an entity name (e.g., an Entity-Set or Entity-Type of the data model). Then when the user continues typing b-y (as prefix of 'find employees by . . . ') the system understands that after the "by" should probably come a property name of the selected entity (e.g., a Property or Navigation Property of the data model).

Thus, in some implementations, one or more of multiple alternative steps can be performed. For example, a step 506A can be performed when completion of an entity set is required. In step 508A, the search sub-component 310 can instruct the index management layer 316 to search the index for one or more entity sets based on the prefix typed by the user. At 510A, the index management layer 316 can provide one or more entity set results in response.

As another example, a step 506B can be performed when completion of a property is required. At 508B, the search sub-component 310 can instruct the index management layer 316 to search the index for one or more properties based on the prefix typed by the user. At 510B, the index management layer 316 can provide one or more property results in response.

In some implementations, the auto-completion can consider multiple variables. For example, the query sentence structure, the different service components, and/or the allowed operations on them (as read, create, update, delete, filter, etc.) can be considered.

In some implementations, all auto-completed queries can be searched as a free-text query to display the appropriate search results with more details. For example, this can involve displaying the service context, using highlighting, etc.

At 512, the search sub-component 310 provides one or more possible query completions to the design time tool 306. The design time tool 306 presents the one or more possible completions to the user 304 at 514. This can involve displaying one or more entity sets, properties and/or other components of the index architecture to the user. For example, one or more services, service descriptions or functions can be presented.

Search results are ranked. In some implementations, search results that are sourced in hierarchical entities should consider the whole context in order to calculate the relevance of the result to the user. For example, the term's position in the hierarchy, and/or the amount of components having the search can be taken into account.

In some implementations, scoring can be performed as follows. Each result can be provided two or more scores. That is, the result originates in a specific index document representing a specific component of the hierarchy which is part of an entity, so the multiple scores can consider different aspects of the result context.

A component score can be used that represents the average percentage of query words that appear in each component of the hierarchy levels. Such a score can reflect the amount of levels in which each query word has a match. For example, if the hierarchy includes Property, Entity-Set and Service levels then each result can be given three scores: a property score for the percentage of query words that match the related property index document, an entity-set score for the percentage of query words that match the related entity-set index document, and a service score for the percentage of query words that match the related service index document. The component score can then be the average of the property, entity-set and service scores.

A cross-component score can be used that represents the percentage of query words that appear in any component of the hierarchy levels that relate to this search result. For example, if the hierarchy has Property, Entity-Set and Service levels, then there is calculated for each result the percentage of query words that match any of the related index documents (e.g., the property, its entity-set or its service).

Scores can be weighted. In some implementations, a component score and a cross-component score can be weighted. For example, the component score can be multiplied by a factor 0.3 and the cross-component score can be multiplied by a factor 0.6, and the multiplications can be added.

In some implementations, the scores can be boosted according to different criteria, for example: since the first query word is usually more important than the others, the results including the first word can be boosted. As another example: results can be boosted where different query words appear on the same field (of the same index document), or boosting results origins in a specific index field which may be considered as more important or more reliable (such as an entity label value, which does not include technical names as the entity name field).

In some implementations, results originating in longer words are boosted. For example, there may be a higher possibility for relevancy and reliability of the result when a longer string is matched, especially when the search considers substring of terms, and not only exact terms.

Figure 6:
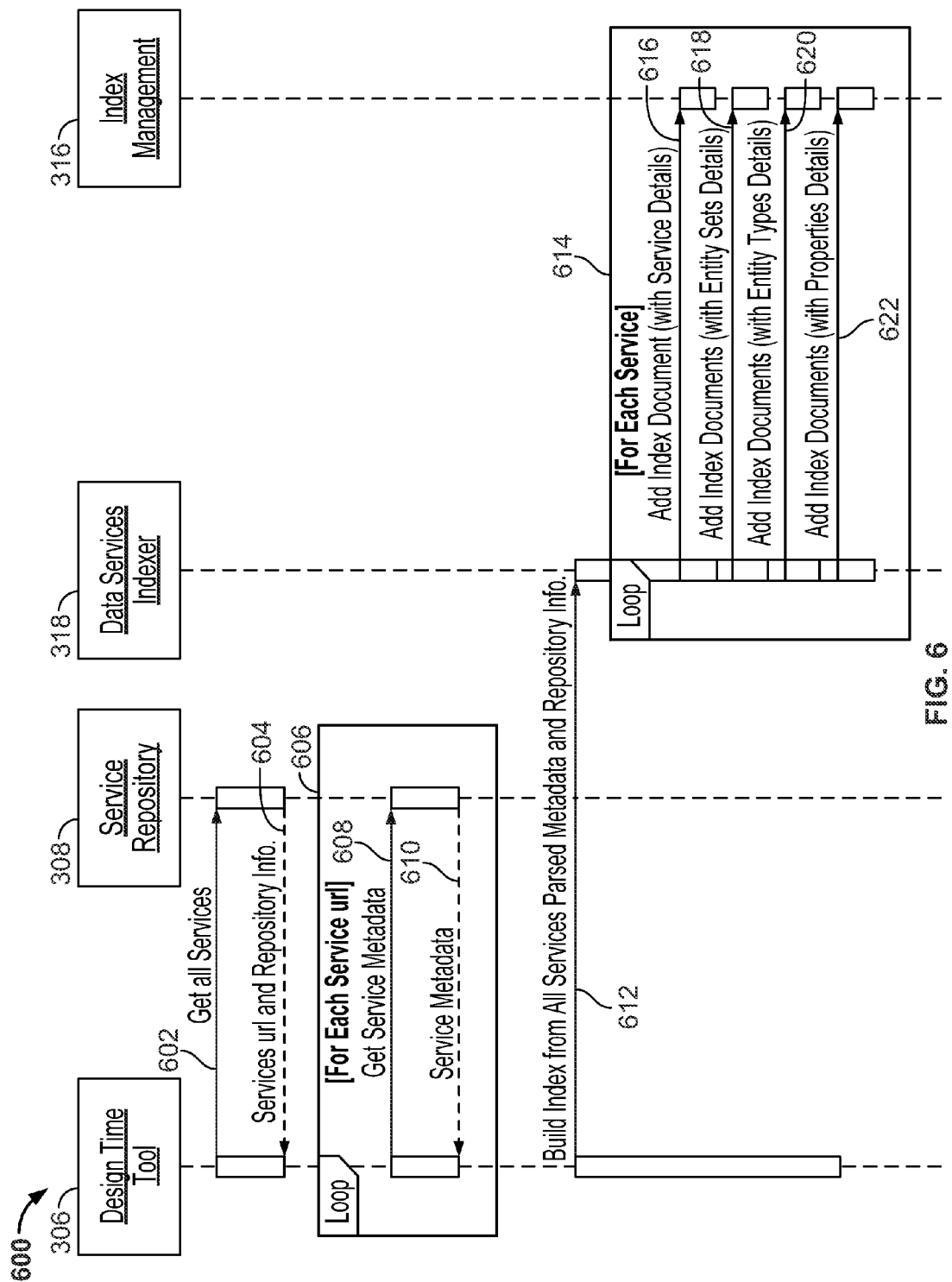
FIG. 6 shows an example of a build index sequence.

FIG. 6 shows an example of a build index sequence 600. For example, the sequence 600 can be performed as a preprocessing step to allow later searching among services by one or more developers. The build index sequence 600 here involves some entities from FIG. 3: the design time tool 306, the service repository 308, the data services indexer 318 and the index management layer 316. More or fewer components can be used in some implementations.

At 602, the design time tool 306 provides an instruction to get all services to the service repository 308. At 604, the service repository 308 provides one or more services URLs and repository information in response.

One or more loops can be performed. For example, a loop 606 involving the design time tool 306 and the service repository 308 can be performed. At 608, the design time tool 306 provides an instruction to get service metadata to the service repository 308. At 610, the service repository 308 provides one or more portions of service metadata in response.

At 612, the design time tool 306 provides a build index instruction to the data services indexer 318. For example, the instruction can be to build one or more indexes from the parsed metadata of all services and their repository information.

Next, a loop 614 of one or more operations can be performed. For example, one or more index documents can be provided to the index management layer 316 for being added to the index. At 616, an index document with service details can be provided. At 618, 620 and 622, respectively, can be provided index documents with entity set details, entity types details and properties details. Other index documents can be added in some implementations.

In some implementations, a solution can be extended to perform service composition. For example, the system can analyze the user query, understand the desired operation the user would like to perform using the available services, and suggest a sequence of service operations and/or components to query that together will compose the desired operation.

For example, this may be supported using a search of combination of services which may have some operations, entry types or properties that can be related together among the services, in order to perform the desired action. As another example, this combination can be used to compose a new service that uses the other services to perform the desired operation, or to suggest the sequence of operations by the different services in the combination that should be used to perform the desired operation.

In some implementations, a solution can be extended to get more resources for understanding the semantic context of a search query, and for getting other semantic forms for the query terms (except for a pre-defined dictionary).

In some implementations, other possible extensions to the system in order to improve and refine the performed searches include:

Using the application context (such as the types and variables names that are used) as additional semantic information for performing the search and for displaying results that better match the developer needs of a service consumption. For example, this can be done when the search is performed directly from the development environment where the application consuming the service is developed.

Learning from searches performed by different users (as well as the result finally selected from the search result list) in order to display more relevant results for similar future searches.

Allowing users to add their own terms and synonyms to the dictionary used by the system, in order to improve future searches (performed by the same and/or other users).

Figure 7:
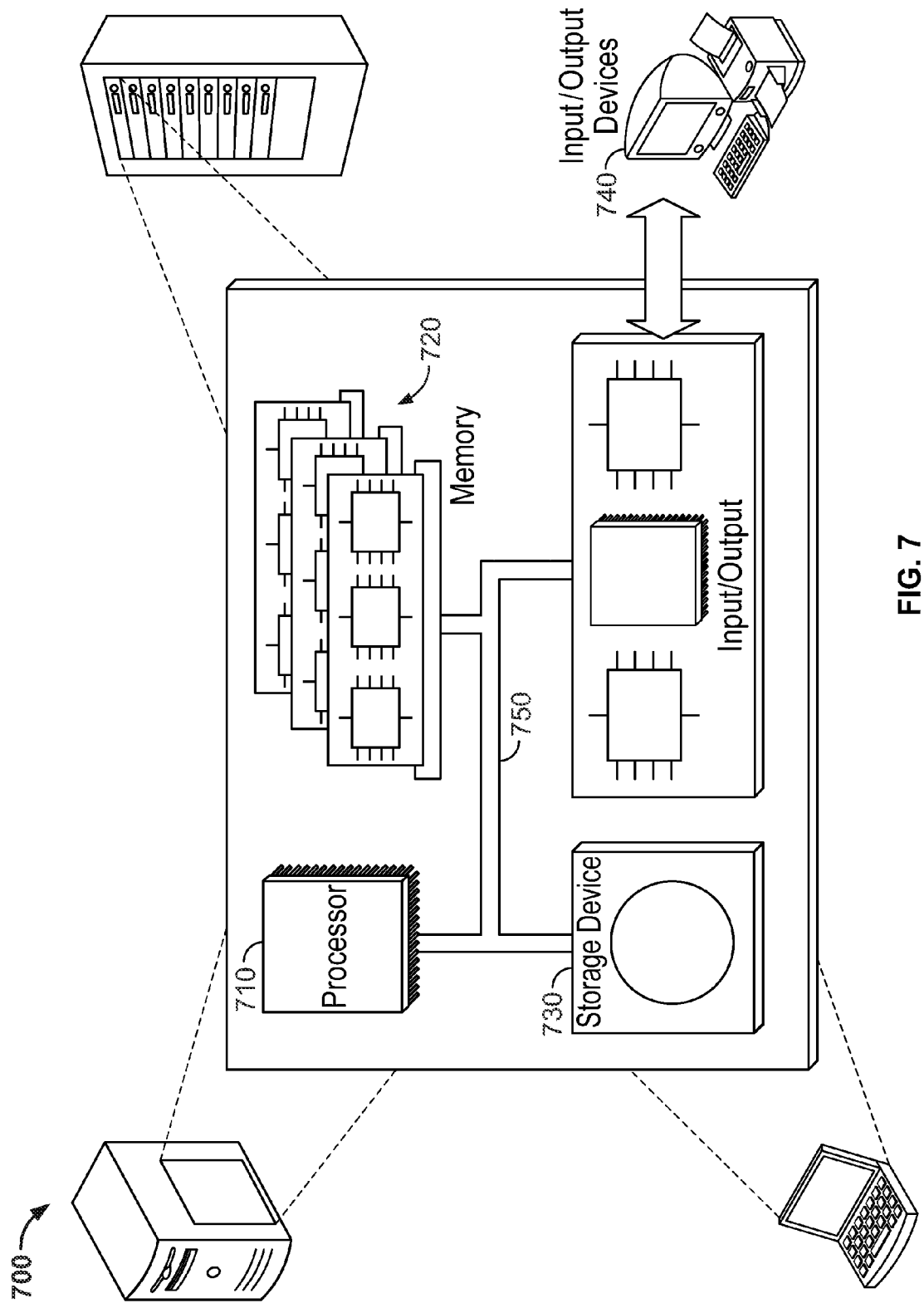
FIG. 7 is a block diagram of a computing system that can be used in connection with computer-implemented methods described in this document.

FIG. 7 is a schematic diagram of a generic computer system 700. The system 700 can be used for the operations described in association with any of the computer-implement methods described previously, according to one implementation. The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In some implementations, the memory 720 is a computer-readable medium. The memory 720 is a volatile memory unit in some implementations and is a non-volatile memory unit in other implementations.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 40 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method for performing a search of services, the method comprising:
   receiving a search string that includes multiple words and that a user inputs for searching services in a repository;
   searching a multi-document index using the search string, the multi-document index identifying, for each of the services, multiple documents that each reflect at least one aspect regarding the service;
   providing multiple results in response to the search of the multi-document index, each of the multiple results being associated with a corresponding service and the multiple documents identified in the multi-document index for the corresponding service;
   scoring the multiple results by providing, for each of the results:
      a first score that reflects an amount of the words from the search string that appear in any of the multiple documents that are associated with the result, and
      a second score that reflects a combination of:
         (i) one score that identifies an amount of the words from the search string that appear in a first one of the multiple documents that are associated with the result, and
         (ii) another score that identifies an amount of the words from the search string that appear in a second one of the multiple documents that are associated with the result;
   generating, for each of the results, a weighted score by weighting the first score and the second score for the result;
   ranking the results based on the weighted score that generated for each of the results; and
   presenting an outcome of the search of the multi-document index to the user in response to receiving the search string, wherein the ranked results are included in the outcome of the search.

2. The computer-implemented method of claim 1, wherein the multi-document index identifies, for at least some of the services:
   a service document that represents the service;
   an entity-set document that represents a data element of the service;
   an entity-type document that represents a data type of one or more entries being returned as a service response;
   a complex-type document that represents a data type of a non-simple typed property;
   a function document that represents at least one service operation of an entity set;
   a navigation property document that represents at least one association from an entity-type entity to one or more related entities of another entity type;
   a property document that represents a field of a data type; and
   a parameter document that represents a service operation parameter.

3. The computer-implemented method of claim 1, further comprising:
   parsing the search string to generate multiple words;
   using a first one of the multiple words parsed from the search string to generate a first list of results;
   using a second one of the multiple words parsed from the search string to generate a second list of results, wherein the second list of results is different from the first list of results; and
   combining the first list of results and the second list of results into a single result list.

4. The computer-implemented method of claim 1, further comprising generating one or more semantic forms of at least one of the words from the search string, wherein the semantic forms are used in searching the multi-document index.

5. The computer-implemented method of claim 4, wherein generating the one or more semantic forms comprises:
   identifying one or more synonyms, abbreviations, acronyms, or naming conventions for the at least one of the words from the search string;
   generating, for each of the at least one of the words from the search string and the one or more semantic forms, a wildcard query that has a wildcard character before and after the word or the semantic form; and
   searching the documents using each of the generated wildcard queries.

6. The computer-implemented method of claim 1, wherein:
   the first score represents an average of the one score and the another score, the one score identifying a percentage of words from the query that appear in the first one of the multiple documents that are associated with the result, the another score identifying a percentage of the words from the search string that appear in the second one of the multiple documents that are associated with the result, and the second score represents a percentage of the words from the search string that appear in any of the multiple documents that are associated with the result.

7. A computer program product tangibly embodied in a non-transitory computer-readable storage medium and comprising instructions that when executed by a processor perform a method for performing a search of services, the method comprising:
receiving a search string that includes multiple words and that a user inputs for searching services in a repository;
searching a multi-document index using the search string, the multi-document index identify, for each of the services, multiple documents that each reflect at least one aspect regarding the service;
providing multiple results in response to the search of the multi-document index, each of the multiple results being associated with a corresponding service and the multiple documents identified in the multi-document index for the corresponding service;
scoring the multiple results by providing, for each of the results:
  a first score that reflects an amount of the words from the search string that appear in any of the multiple documents that are associated with the result, and
  a second score that reflects a combination of:
    (i) one score that identifies an amount of the words from the search string that appear in a first one of the multiple documents that are associated with the result, and
    (ii) another score that identifies an amount of the words from the search string that appear in a second one of the multiple documents that are associated with the result;
generating, for each of the results, a weighted score by weighting the first score and the second score for the result;
ranking the results based on the weighted score that was generated for each of the results; and
presenting an outcome of the search of the multi-document index to the user in response to receiving the search string, wherein the ranked results are included in the outcome of the search.

8. The computer program product of claim 7, wherein the multi-document index identifies, for at least some of the services:
a service document that represents the service;
an entity-set document that represents a data element of the service;
an entity-type document that represents a data type of one or more entries being returned as a service response;
a complex-type document that represents a data type of a non-simple typed property;
a function document that represents at least one service operation of an entity set;
a navigation property document that represents at least one association from an entity-type entity to one or more related entities of another entity type;
a property document that represents a field of a data type; and
a parameter document that represents a service operation parameter.

9. The computer program product of claim 7, the method further comprising:
parsing the search string to generate multiple words;
using a first one of the multiple words parsed from the search string to generate a first list of results;
using a second one of the multiple words parsed from the search string to generate a second list of results, wherein the second list of results is different from the first list of results; and
combining the first list of results and the second list of results into a single result list.

10. The computer program product of claim 7, the method further comprising generating one or more semantic forms of at least one of the words from the search string, wherein the semantic forms are used in searching the multi-document index.

11. The computer program product of claim 10, wherein generating the one or more semantic forms comprises:
identifying one or more synonyms, abbreviations, acronyms, or naming conventions for the at least one of the words from the search string;
generating, for each of the at least one of the words from the search string and the one or more semantic forms, a wildcard query that has a wildcard character before and after the word or the semantic form; and
searching the documents using each of the generated wildcard queries.

12. The computer program product of claim 7, wherein:
the first score represents an average of the one score and the another score, the one score identifying a percentage of words from the query that appear in the first one of the multiple documents that are associated with the result, the another score identifying a percentage of the words from the search string that appear in the second one of the multiple documents that are associated with the result, and
the second score represents a percentage of the words from the search string that appear in any of the multiple documents that are associated with the result.

13. A system comprising:
one or more processors; and
a computer program product tangibly embodied in a computer-readable storage medium and comprising instructions that when executed by a processor perform a method for performing a search of services, the method comprising:
receiving a search string that includes multiple words and that a user inputs for searching services in a repository;
searching a multi-document index using the search string, the multi-document index identifying, for each of the services, multiple documents that each reflect at least one aspect regarding the service;
providing multiple results in response to the search of the multi-document index, each of the multiple results being associated with a corresponding service and the multiple documents identified in the multi-document index for the corresponding service;
scoring the multiple results by providing, for each of the results:
  a first score that reflects an amount of the words from the search string that appear in any of the multiple documents that are associated with the result, and
  a second score that reflects a combination of:
    (i) one score that identifies an amount of the words from the search string that appear in a first one of the multiple documents that are associated with the result, and
    (ii) another score that identifies an amount of the words from the search string that appear in a second one of the multiple documents that are associated with the result;

generating, for each of the results, a weighted score by weighting the first score and the second score for the result;

ranking the results based on the weighted score that was generated for each of the results; and presenting an outcome of the search of the multi-document index to the user in response to receiving the search string, wherein the ranked results are included in the outcome of the search.

14. The system of claim 13, wherein the multi-document index identifies, for at least some of the services:

a service document that represents the service;

an entity-set document that represents a data element of the service;

an entity-type document that represents a data type of one or more entries being returned as a service response;

a complex-type document that represents a data type of a non-simple typed property;

a function document that represents at least one service operation of an entity set;

a navigation property document that represents at least one association from an entity-type entity to one or more related entities of another entity type;

a property document that represents a field of a data type; and a parameter document that represents a service operation parameter.

15. The system of claim 13, the method further comprising:

parsing the search string to generate multiple words;

using a first one of the multiple words parsed from the search string to generate a first list of results;

using a second one of the multiple words parsed from the search string to generate a second list of results, wherein the second list of results is different from the first list of results; and combining the first list of results and the second list of results into a single result list.

16. The system of claim 13, the method further comprising generating one or more semantic forms of at least one of the words from the search string, wherein the semantic forms are used in searching the multi-document index, wherein generating the one or more semantic forms comprises:

identifying one or more synonyms, abbreviations, acronyms, or naming conventions for the at least one of the words from the search string;

generating, for each of the at least one of the words from the search string and the one or more semantic forms, a wildcard query that has a wildcard character before and after the word or the semantic form; and searching the documents using each of the generated wildcard queries.

17. The system of claim 13, wherein:

the first score represents an average of the one score and the another score, the one score identifying a percentage of words from the query that appear in the first one of the multiple documents that are associated with the result, the another score identifying a percentage of the words from the search string that appear in the second one of the multiple documents that are associated with the result, and the second score represents a percentage of the words from the search string that appear in any of the multiple documents that are associated with the result.

\* \* \* \* \*